(12) United States Patent
Zimmer et al.

(10) Patent No.: US 7,751,123 B2
(45) Date of Patent: *Jul. 6, 2010

(54) OPTICAL ELEMENTS MADE FROM CERAMICS COMPRISING ONE OR MORE OXIDES OF Y, SC, IN AND/OR LANTHANIDE ELEMENTS AND MAPPING OPTICS INCLUDING THE OPTICAL ELEMENTS

(75) Inventors: Jose Zimmer, Losheim am See (DE); Ulrich Peuchert, Bodenheim (DE); Jochen Alkemper, Klein-Winternheim (DE); Martin Letz, Mainz (DE); Steffen Reichel, Mehlingen (DE); Yoshio Okano, Mainz (DE); Yvonne Menke, Mainz (DE)

(73) Assignee: Schott AG, Mainz (DE)

( * ) Notice: Subject to any disclaimer, the term of this patent is extended or adjusted under 35 U.S.C. 154(b) by 436 days.

This patent is subject to a terminal disclaimer.

(21) Appl. No.: 11/762,124

(22) Filed: Jun. 13, 2007

(65) Prior Publication Data

US 2008/0094734 A1    Apr. 24, 2008

(30) Foreign Application Priority Data

Jun. 14, 2006   (DE)   ............ 10 2006 027 957

(51) Int. Cl.
   *G02B 3/00*   (2006.01)
   *C04B 35/50*  (2006.01)
(52) U.S. Cl. .............. 359/642; 359/737; 501/152; 501/41; 501/901; 501/904
(58) Field of Classification Search .......... 501/152, 501/41, 904, 901; 359/642, 737
See application file for complete search history.

(56) References Cited

U.S. PATENT DOCUMENTS

| | | | |
|---|---|---|---|
| 3,432,314 A | 3/1969 | Mazdiyasni et al. | |
| 3,545,987 A | 12/1970 | Anderson | |
| 3,640,887 A | 2/1972 | Anderson | |
| 4,098,612 A | 7/1978 | Rhodes et al. | |

(Continued)

FOREIGN PATENT DOCUMENTS

EP    0 263 662    4/1988

(Continued)

OTHER PUBLICATIONS

Database WPI Week 200631, Derwent Publications Ltd., London, GB; AN 2006-295039. XP 002452725 & CN 1 660 716 A (Univ Shanghai) Aug. 31, 2005, Abstract.

(Continued)

*Primary Examiner*—Evelyn A. Lester
(74) *Attorney, Agent, or Firm*—Michael J. Striker

(57) ABSTRACT

The refractive, transmissive or diffractive optical elements are made from a ceramic containing one or more oxides of the type $X_2O_3$, which is transmissive for visible light and/or for infrared radiation and which has a cubic crystal structure analogous to that of $Y_2O_3$. In preferred embodiments X is Y, Sc, In, or a lanthanide element, namely La to Lu, and in particular is Lu, Yb, Gd, or La. Also mixtures of oxides of the type $X_2O_3$ with oxides having different stoichiometries, such as $HfO_2$ and/or $ZrO_2$, may be present, as long as the cubic structure of the ceramic is maintained.

21 Claims, 8 Drawing Sheets

(1)

(2)

(3)

(4)

U.S. PATENT DOCUMENTS

| | | | |
|---|---|---|---|
| 4,147,744 A | 4/1979 | Rhodes | |
| 4,571,312 A | 2/1986 | Greskovich et al. | |
| 4,747,973 A | 5/1988 | Cusano et al. | |
| 4,755,492 A | 7/1988 | Greskovich et al. | |
| 4,761,390 A | 8/1988 | Hartnett et al. | |
| 6,908,872 B2 | 6/2005 | Tanaka et al. | |
| 6,989,930 B2 | 1/2006 | Shinoda | |
| 2005/0065012 A1* | 3/2005 | Rosenflanz et al. | 501/41 |
| 2005/0065013 A1 | 3/2005 | Rosenflanz et al. | |
| 2006/0011839 A1 | 1/2006 | Zhan et al. | |
| 2006/0012885 A1 | 1/2006 | Beder et al. | |
| 2006/0061880 A1 | 3/2006 | Kawakami | |
| 2006/0062569 A1 | 3/2006 | Sato | |
| 2007/0291378 A1* | 12/2007 | Kron et al. | 359/784 |

FOREIGN PATENT DOCUMENTS

| | | |
|---|---|---|
| EP | 0 277 811 | 8/1988 |
| EP | 1 775 273 | 4/2007 |
| GB | 1 202 032 | 8/1970 |
| JP | 6-211573 | 8/1994 |
| JP | 2000-203933 | 7/2000 |
| JP | 2003-128465 | 5/2003 |
| JP | 2006-91430 | 4/2006 |
| JP | 2006-91482 | 4/2006 |
| WO | 2006/003726 | 1/2006 |

OTHER PUBLICATIONS

Database WPI Week 200662. Derwent Publications Ltd., London, GB; AN 2006-595678. XP002452726 & CN 1 760 157 A (Shanghai Inst Silicate Cas) Apr. 19, 2006, Abstract.

"The Properties of Optical Glass" Bach et al, Berlin, Springer 1995.

"The Properties of Optical Glass" Bach et al, Berlin, Springer. Schott Series on Glass and Glass Ceramics: Science, Technology and Applications: 1); XVII, 410 P-2., Corr. Print 1998, XVII, 414P.

J. Mouzon: Licenciate Thesis "Synthesis of YB:Y2O3 Nanoparticles and Fabrication of Transparent Polycrystalline Yttria Ceramics" Lulea University of Technology, Int. No. 2005:29.

Wei, G.C.: "Transparent Ceramic Lamp Envelope Materials" Journal of Physics D: Applied Physics. 2005. vol. 38 pp. 3057-3065.

\* cited by examiner (1)

(2)

(3)

(4)

OPTICAL ELEMENTS MADE FROM CERAMICS COMPRISING ONE OR MORE OXIDES OF Y, SC, IN AND/OR LANTHANIDE ELEMENTS AND MAPPING OPTICS INCLUDING THE OPTICAL ELEMENTS

CROSS-REFERENCE

The disclosure in German Patent Application DE 10 2006 027 957.3 of Jun. 14, 2006 is explicitly incorporated here by reference. This German Patent Application also describes the same invention that is disclosed here and provides the basis for a claim of priority for the instant invention under 35 U.S.C. 119.

BACKGROUND OF THE INVENTION

1. The Field of the Invention

The subject matter of the present invention is refractive, transmissive or diffractive optical elements, comprising a ceramic comprising one or more oxides of the type $X_2O_3$, which is transmissive for visible light and/or for infrared radiation and which has a cubic crystal structure (in the following disclosure this means a cubic structure that is analogous to that of $Y_2O_3$). According to preferred embodiments X is an element selected from the group consisting of Y, Sc, the lanthanides La to Lu, and in particular is Lu, Yb, Gd or La. Also mixtures of the type $X_2O_3$ with oxides having a different stoichiometry, such as for example $HfO_2$ and/or $ZrO_2$, are possible, as long as the cubic structure of the ceramic is maintained.

In the following the ceramic is also referred to as an opto-ceramic. According to the present invention, an opto-ceramic (or ceramic) is, as mentioned above, a highly transparent, polycrystalline single-phase material comprising an oxide. Opto-ceramics are to be understood as a particular subgroup of ceramics. "Single phase" means that more than 95% by weight, preferably at least 97% by weight, more preferably 99% by weight, and most preferred 99.5 to 99.9% by weight are in the crystalline form of the intended composition.

The refractive optical elements are suitable for use in mapping optics, for example objectives having reduced chromatic aberrations, in particular with approximately apochromatic mapping behavior. The optical elements made of transparent ceramic may be used in lens systems in combination with lenses of glass, but also with other ceramic lenses, in particular also in digital cameras, mobile phone cameras, in the field of microscopy, microlithography, optical data storage or other applications in the field of consumer or industrial applications.

2. The Related Art

The main aim in the development of mapping optics is to attain sufficient optical quality with a compact optical set-up, which is as light as possible. In particular for applications in the field of digital image detection in electronic apparatuses, such as for example digital cameras, objectives of mobile phones and the like, the mapping optic has to be constructed very small and lightweight. In other words, the total amount of mapping lenses must be minimal. This requires transparent materials with high refractive index and a dispersion which is as low as possible to thus allow the design of very compact mapping optics having approximately apochromatic mapping behavior.

In the case of microscopy, nearly diffraction-limited mapping optics is necessary for the ocular as well as the objective.

In the field of defense, transparent optics are required which have high transmittance in the visible (380 to 800 nm) and also in the infrared spectral range up to 8,000 nm, ideally up to 10,000 nm and, in addition, which are resistant against influences from outside, such as mechanical action, shock, temperature, change of temperature, pressure etc.

For many other technologies the same applies, for example for digital projection and for display techniques. But also in predominantly monochromatic applications, such as the optical storage technologies, compact systems can be realized by means of materials having high refractive index.

At the moment, the development of mapping optics is limited by the optical parameters of the available materials. By the available techniques of glass melting and glass forming, only such kinds of glasses having high quality can be produced which are below a line which approximately passes through the points defined by Abbe number=80/refractive index=1.7 and by Abbe number=10/refractive index=2.0 in an Abbe diagram plotting the refractive index against the Abbe number. This imaginary line is shown in FIG. 2a by a dotted line. In more detail, glasses having a refractive index of between about 1.9 and about 2.2 and an Abbe number in a range of between about 30 and 40 tend to be unstable, so that it is very difficult to produce such glasses in large amounts and with sufficient quality. Also glasses having a refractive index of between about 1.8 and about 2.1 and an Abbe number in a range of between about 30 and 45 tend to be unstable.

The definitions of refractive index (refractive number) $n_d$, Abbe number $v_d$ and relative partial dispersion (for example $P_{g,F}$) are in principle well known for a person skilled in the art and may be defined in more detail by the means of specialized literature. In the sense of the present invention, the terms are used according to the definitions in "The properties of optical glass"; Hans Bach, Norbert Neuroth (Eds.), Berlin (i.a.): Springer, 1995.—(Schott series on Glass and Glass ceramics: Science, Technology, and Applications; 1); XVII, p. 410-2., corr. print. 1998, XVII, p. 414.

In addition to refractive index and Abbe number, the relative partial dispersion plays an important role in the selection of an optical material. If it is desired to prepare approximately apochromatic optics, materials having approximately the same relative partial dispersion, but a high difference in the Abbe number must be combined. If the partial dispersion $P_{g,F}$ is plotted against the Abbe number (FIG. 2b), most glasses are on one line (the "normal line"). Therefore materials are desired having behavior with a different combination of Abbe number and relative partial dispersion.

At the moment materials, which are above the before mentioned imaginary line in an Abbe diagram, are exclusively single crystals or polycrystalline materials. However, the production of single crystals by means of the known crystal drawing processes is extremely costly and has enormous limitations with respect to chemical composition. Furthermore for most applications crystals cannot be produced close to the final format, so that this results in an enormous effort of post-processing. Although polycrystalline ceramics can be produced within a broader range of compositions, normally they have insufficient optical qualities, in particular with respect to the homogeneity of the refractive index and the transparency. Till today, only few ranges of compositions and structure types are known, in which transparent ceramics having sufficient optical quality can be produced.

Therefore, polycrystalline ceramics have only been used to a limited extent in optical applications till today. Thus for example, the Japanese Patent Publication JP 2000-203933 discloses production of polycrystalline YAG by means of a special sintering process. Recently, also the production of polycrystalline YAG of optical quality as a laser host material has been achieved, for example for doping with laser-active ions, for example Nd.

In U.S. Pat. No. 6,908,872 translucent ceramics are described which use barium oxide as an oxide, which has to be present in the ceramic. The thus obtained ceramics have a perovskite structure and are para-electric. However, ceramics containing such barium-containing phases having perovskite structure often have insufficient optical mapping quality. This is a result of the tendency of many perovskites to form distorted ferro-electric crystal structures and thus to loose their optical isotropy. Inter alia, this results in undesired double refraction of the crystals, from which the ceramic is built, and, in addition, the transmittance in the range of blue light (about 380 nm) is insufficient.

U.S. Pat. No. 3,640,887 describes production of opto-ceramics on the basis of cubic oxides of the stoichiometry $X_2O_3$ ("sesquioxides"). In an exemplary way, only optically active oxides are mentioned which are colored because of absorption bands in the visible (wavelengths of ca. 380 nm to 800 nm). As a sintering aid, i.a., $ThO_2$ is used. This one is not desired due to toxicity, respectively radioactivity. The like belongs to U.S. Pat. No. 3,545,987.

U.S. Pat. No. 4,761,390 discloses a cover plate that substantially consists of a $Y_2O_3$ ceramic.

Also U.S. Pat. No. 4,755,492 describes a transparent ceramic $Y_2O_3$ as well as its production from powders, which are produced by oxalate precipitation processes. The applications relate to discharge vessels for high-pressure discharge lamps.

U.S. Pat. No. 4,098,612 describe transparent ceramics of mixed oxides of $Y_2O_3$ and $Al_2O_3$ for discharge vessels. $Al_2O_3$ may be contained in an amount of up to 5% by weight, which results in the absence of a cubic structure. The like belongs to transparent ceramic $Y_2O_3$ having high contents of $La_2O_3$ from U.S. Pat. No. 4,147,744. U.S. Pat. No. 4,571,312 and U.S. Pat. No. 4,747,973 describe opto-ceramics of the system $Y_2O_3$—$Gd_2O_3$ which, doped with lanthanides that are optically active in the UV-VIS (ultraviolet-visible range), are used as optically active scintillator materials for medical techniques.

JP 2003-128465 and WO 06/03726 describe production of opto-ceramics on the basis of $Sc_2O_3$ and $Lu_2O_3$. To them are added optically active additives and thus, they are of interest for laser systems.

US 2006/061880 and US 2006/062569 describe the combination of optical mapping systems consisting of at least one lens of ceramic and additional lenticular components of glass, but advantageous effects of the ceramic (owing to e.g. a convenient dispersion behavior) for the whole system is not mentioned. The ceramic lens with extremely high refractive index ($n_d$=2.08) is in direct contact with a glass lens ($n_d$=1.62). Particularly thus costly measures have to be taken to avoid the problem of light scattering associated with the high difference in $n_d$. Thus e.g. in US 2006/062569, the ceramic lens must be connected with a glass lens, the light scattering must be reduced and distributed homogenously over the image detector by a special arrangement of this glass-ceramic-putty member in the optical mapping system.

SUMMARY OF THE INVENTION

The object of the present invention is to provide a material having a high refractive index, a high Abbe number and/or an excellent, special relative partial dispersion, which parameters cannot be achieved with conventional glass, single crystal or polycrystalline ceramic materials. According to a further aspect of the present invention, an optical component made from this improved material is provided. According to an additional aspect of the present invention, a mapping optic with an optical element that is made from this improved material is provided. According to a further aspect of the present invention, in particular a mapping optic with approximately apochromatic mapping behavior is provided. According to another aspect of the present invention, optical components having high transparency in the visible and/or infrared wavelength region are provided. Preferably, the optical components are transmissive (transparent) for both, visible light and also infrared radiation.

Transparency in the visible means an internal transmittance (i.e. the light transmittance minus reflection losses) which is, within a window having a width of at least 200 nm, for example within a window of 400 to 600 nm, a window of 450 to 750 nm or preferably a window of 400 to 800 nm, in the range of the visible light having wavelengths of 380 nm to 800 nm, higher than 70%, preferably >80%, more preferably >90%, particularly preferably >95%, at a layer thickness of 2 mm, preferably even at a layer thickness of 3 mm, particularly preferably at a layer thickness of 5 mm.

Transparency in the infrared means the internal transmittance (i.e. the light transmittance minus reflection losses) which is, within a window having a width of at least 1,000 nm, for example within a window of 1,000 to 2,000 nm, a window of 1,500 to 2,500 nm or preferably a window of 3,000 to 4,000 nm, in the range of the infrared light having wavelengths of 800 nm to 5,000 nm, higher than 70%, preferably higher than 80%, more preferably higher than 90%, particularly preferably higher than 95%, at a layer thickness of 2 mm, preferably even at a layer thickness of 3 mm, particularly preferably at a layer thickness of 5 mm.

Ideally, the material has a transmittance (incl. reflection losses) of more than 20% within a window of wavelengths with a width of more than 200 nm between 5,000 nm and 8,000 nm at a thickness of 3 mm.

These and other objects are attained according to the present invention by a refractive, transmissive or diffractive optical element, which comprises a ceramic consisting of a crystal combination in which individual single crystallites have a cubic structure that is analogous to that of $Y_2O_3$, which is transparent to visible light and/or to infrared radiation, and which comprises an oxide or at least two oxides of the type $X_2O_3$.

The mapping optic according to the present invention comprises at least two lenses of at least two different transparent materials, one of which is formed as an optical element of the present invention, as described herein above.

Additional advantageous embodiments are described and claimed in the dependent claims appended herein below.

The opto-ceramics according to the present invention are preferably prepared by sintering at least one oxide or a mixture of oxides of the type $X_2O_3$, each preferably selected from the group consisting of $Y_2O_3$, $Sc_2O_3$, $In_2O_3$ and oxides of the lanthanide series, in particular oxides of Lu, Yb, Gd and La. The latter are not optically active in the visible spectral region. In this case, it is essential that the ratio of the components of the mixture should be chosen so that the cubic structure type of the type $Y_2O_3$ is maintained. In the sense of the invention, a ceramic having cubic structure means a ceramic, which consists of a crystal combination wherein the single crystallites have a cubic structure. Preferably, the material consists of at least 95% or more of the cubic crystallites, further preferably >98%, even further preferably >99%.

Preferably the optical element according to the invention comprises one or more oxides selected from the group consisting of $In_2O_3$, $La_2O_3$, $Ce_2O_3$, $Pr_2O_3$, $Nd_2O_3$, $Pm_2O_3$, $Sm_2O_3$, $Eu_2O_3$ $Gd_2O_3$ and $Tb_2O_3$.

Mixtures of the oxides of the type $X_2O_3$ with other oxides of other stoichiometries, such as zirconium oxide and hafnium oxide, are also suitable as materials for the opto-ceramics according to the present invention. The amounts of the additives $ZrO_2$ and $HfO_2$ are chosen so that the cubic structure of the type $Y_2O_3$ of the ceramic is maintained. Preferably, the cubic crystals are packed as densely as possible in a structure without defects.

All mixed crystal phases have a cubic crystal structure, which is isotypic to that of pure $Y_2O_3$.

As mentioned above, the present invention also comprises pure oxides of the type $X_2O_3$, which have a cubic crystal structure analogous to that of $Y_2O_3$, such as $Y_2O_3$, $Sc_2O_3$, $In_2O_3$, $Lu_2O_3$ and $Yb_2O_3$.

The crystallites, from which the polycrystalline opto-ceramics are made, have cubic crystal structure. This results in isotropic optical behavior without double refraction. They have dielectric behavior, i.e. because of their cubic structure there are no permanent dipoles and the material has the property of optical isotropy. The single crystallites are, as mentioned above, packed as densely as possible. Theoretical densities of at least 99%, preferably at least 99.9%, and more preferably at least 99.99%, can be achieved. Hence, the ceramics according to the invention (opto-ceramics) nearly do not comprise any pores.

According to a further aspect of the present invention which may also be independently claimed, a mapping optic with lenses of at least two different transparent materials is provided, in which at least one lens consists of an optical ceramic that is formed from the material described above. Therefore, the invention is based on the finding that novel mapping properties can be provided by the use of two different transparent materials in one mapping optic, such as an objective. In particular, one aspect is also the possibility of achromatization of the mapping optic with a relatively low number of refractive optical elements, which cannot be accomplished with known kinds of glass. For example in this case, there is contemplated the use of only three refractive optical elements in total for forming an objective having approximately apochromatic mapping properties. Overall, according to the present invention compact mapping optics having very low weight, low construction depth and with low costs for color correction compared to the multi-lens systems according to prior art may thus be achieved.

In this case, according to a further aspect of the present invention the lenses may have purely refractive behavior. The lenses may be arranged singly or with distances between them. A few of the lenses may in principle also be assembled into a group of lenses, for example as a duplet of lenses, triplet of lenses etc.

According to a further alternative aspect of the present invention, at least one of the lenses may also have diffractive structures which are for example stamped and/or pressed onto or written into the surface of the lens or a volume of the lens, for example in the form of Fresnel zone plates, diffraction gratings and also blazed diffraction gratings.

According to a further preferred embodiment, the mapping optic comprises at least one lens of a glass; thus the mapping optic comprises a lens of the transparent opto-ceramic as described above, and a lens of a glass which is adjusted to that opto-ceramic lens.

According to a further aspect of the present invention, in this case the relative partial dispersions ($P_{g,F}$) of the respective glass and the ceramic are approximately similar to one another; preferably the difference between them is less than about 10%, and the difference of the Abbe numbers of the respective glass and the ceramic is higher than 10, preferably higher than 20. Approximately apochromatic mapping properties of the mapping optic may be achieved by simultaneously providing a comparatively high difference between the Abbe numbers with substantially identical relative partial dispersion.

BRIEF DESCRIPTION OF THE DRAWING

In the following the invention is described in exemplary manner with reference to the accompanying figures, from which further features, advantages and objects to be attained follows, in which.

DESCRIPTION OF THE PREFERRED EMBODIMENTS

Figure 1:
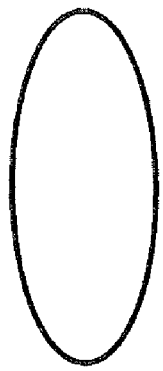
FIG. 1 shows four examples of optical elements according to the present invention.
Figure 1:
Figure 1:
Figure 1:
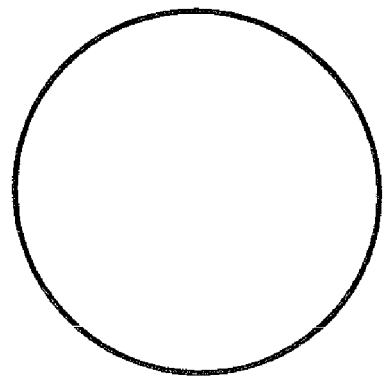
Figure 2A:
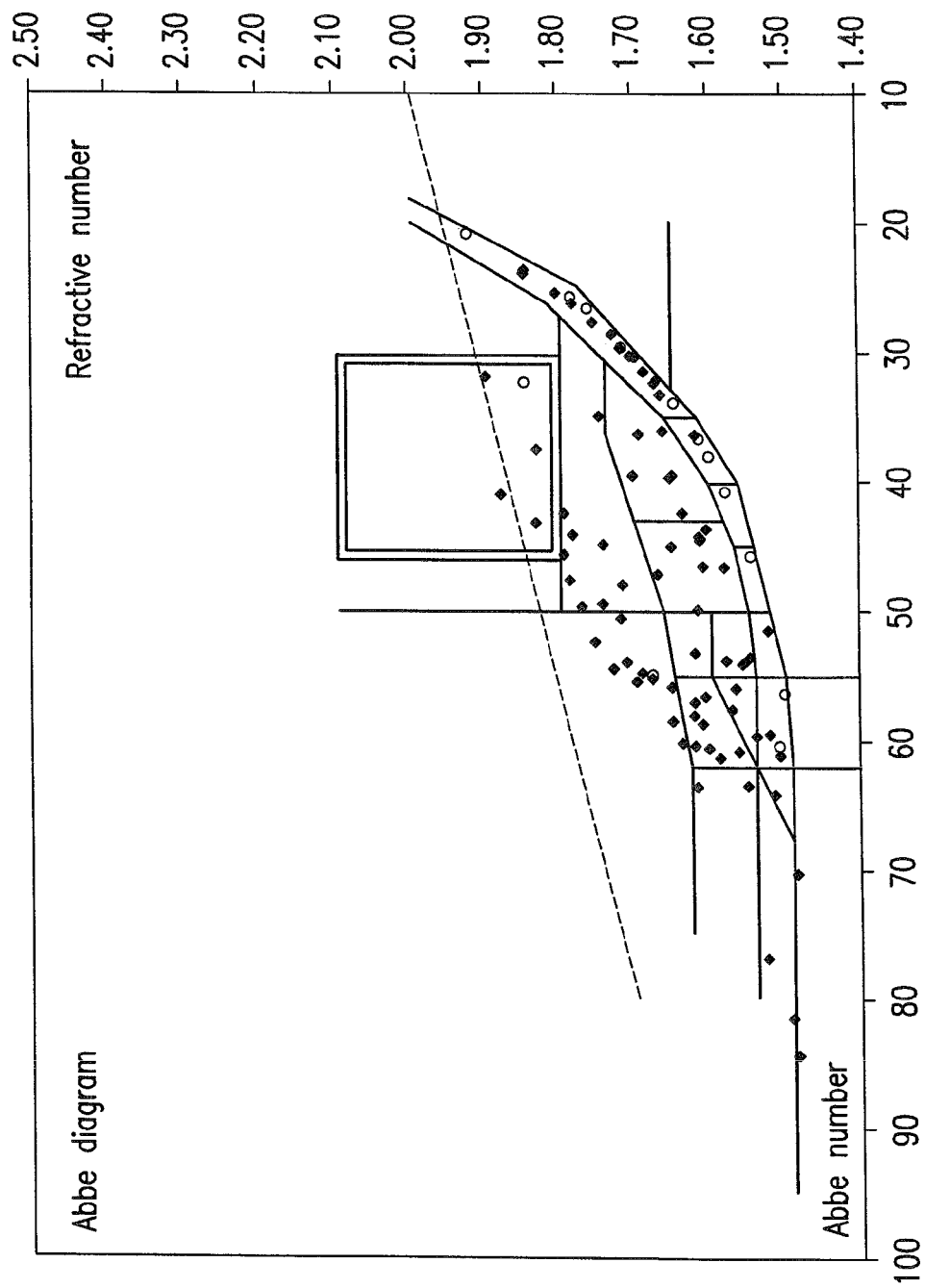
FIG. 2a is an Abbe diagram showing the properties of different glasses and opto-ceramics according to the present invention (Abbe number vs. refractive index)

In the Abbe diagram according to FIG. 2a, points marked with a circular symbol represent in an exemplary way kinds of glasses that can be prepared in high optical quality by the glass melt techniques which are available today. As is clearly obvious from FIG. 2a, with the present techniques of glass melting and glass forming glasses that are above the dotted line that passes through the points Abbe number=80/refractive index=1.7 and Abbe number=10/refractive index=2.0 can only be produced with limitations. In particular, glasses having a refractive index in the range of between 1.80 and 2.1 in combination with an Abbe number of between about 30 and 45 are unstable (see rectangle in FIG. 2a).

As explained below, the opto-ceramics according to the present invention are transparent materials that have a refractive index of between about 1.80 and 2.1 and that have at the same time an Abbe number in the range of between about 30 and 45. This makes it possible to use novel material combinations for achromatization of lens systems.

Figure 2B:
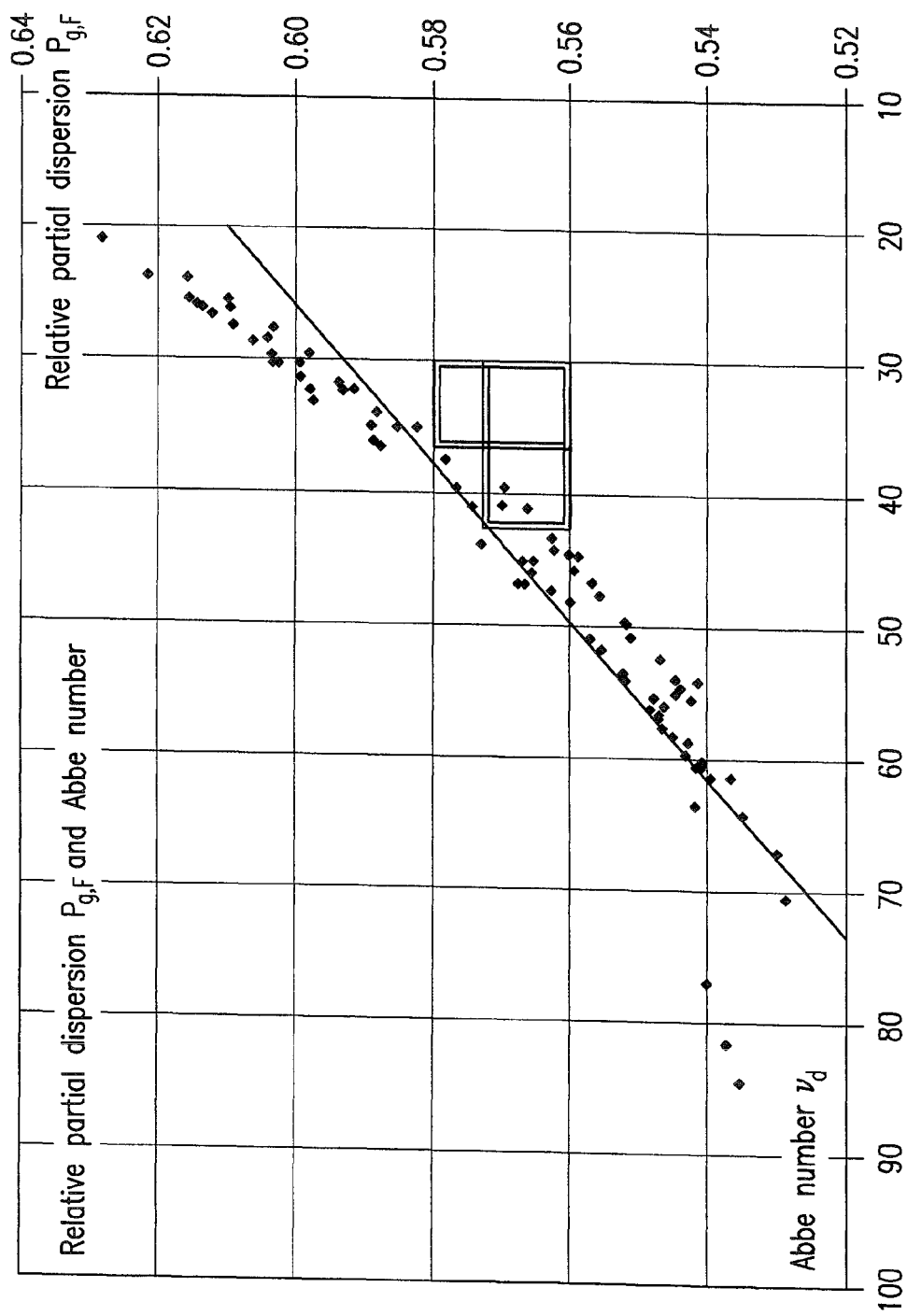
FIG. 2b is a graphical illustration showing the relationship of the positions of glasses and opto-ceramics according to the present invention (relative partial dispersion vs. Abbe number)

In the diagram according to FIG. 2b, the Abbe number of various glasses and single crystalline materials are plotted against the relative partial dispersion, $P_{g,F}$. As can be clearly seen in FIG. 2b, the combination of an Abbe number of between about 30 and 42 and a relative partial dispersion of between about 0.56 and 0.58 cannot be achieved with glasses (see rectangle in FIG. 2b).

As set forth below in more detail, according to the present invention opto-ceramics with Abbe numbers and relative partial dispersions in the above mentioned parameter ranges can be produced. This makes it possible to use novel material combinations for achromatization and/or apochromatization of lens systems.

Within the composition range, different excellent mixtures of the oxides result in cubic phases that are particularly suitable for the production of an opto-ceramic according to the present invention. Thus, for example, mixtures of group A (here referred to as) of the cubic oxides $Y_2O_3$, $Sc_2O_3$, $In_2O_3$, $Lu_2O_3$, $Yb_2O_3$ with up to 99.9% of one or more of other candidates of the mentioned group A have advantageous properties with respect to their position in the graphical illustration of FIG. 2b that shows the dependence of Abbe number vs. relative partial dispersion, $P_{g,F}$.

Also, a candidate of the above-mentioned group A may be mixed with oxides of the group B, $La_2O_3$ or $Gd_2O_3$, wherein the maximum amount depends on the stability of the cubic basis phase. So for example $Gd_2O_3$ can be doped into $Yb_2O_3$ or $Lu_2O_3$ in a maximum amount of ca. 80% by mol, but into $Y_2O_3$ in a maximum amount of only up to ca. 70% by mol. Above these values, the crystal structure is formed as a monoclinic crystal system with low symmetry, which is not desired according to the present invention. For example $La_2O_3$ can be doped into $Lu_2O_3$, $Yb_2O_3$ or $Y_2O_3$ in a maximum amount of 20% by mol.

The oxides that can be used according to the present invention form compounds that normally do not have any optical activity in the visible spectral range, i.e. at ca. 380 to 800 nm, i.e. light in this wavelength range is neither absorbed nor emitted. Substantially, the ceramics are not colored; no fluorescence is present in this case.

For a series of passive optical elements, possible fluorescence has to be suppressed in a targeted way. This can be guaranteed by the use of raw materials with especially high purity. According to one embodiment, the content of optically active impurities (for example active ions of the group of rare earths or transition metals) has to be reduced to a minimum. Preferably, this is <100 ppm, preferably <10 ppm, particularly preferably <1 ppm and most preferably, the opto-ceramics are free of these ions, such as Pr, Nd, Sm, Eu, Tb, Dy, Ho, Er, Tm.

According to a further embodiment of the present invention, these ions (e.g. Pr, Nd, Sm, Eu, Tb, Dy, Ho, Er, Tm) may be added in amounts such that the optical activity (such as laser activity) is strongly impaired which applies to amounts of 15% by mol or higher.

A prerequisite for that is that self-color or fluorescence should not play a role for that application. As long as this is the case, also further element oxides of the lanthanides series may be used. The above-mentioned group A (cubic as pure oxide) may then, for example, be supplemented with $Tb_2O_3$, $Dy_2O_3$, $Er_2O_3$, $Ho_2O_3$ and $Tm_2O_3$.

In total, all combinations between the sesquioxides in which the average cation radius does not exceed 0.93 Angstrom and/or the difference of the cation radii of the cations does not exceed 0.22 are possible.

$ZrO_2$ or $HfO_2$ (group C) may be added in distinct amounts to the above-mentioned oxides and/or oxide mixtures. For example, these amounts are up to 50% by mol of $HfO_2$ or $ZrO_2$ in $Yb_2O_3$ or $Lu_2O_3$ and up to 40% by mol of $HfO_2$ or $ZrO_2$ in $Sc_2O_3$ or $Y_2O_3$. Generally, the content of $ZrO_2$ should not exceed 55% by mol.

$HfO_2$ is possible as raw material, e.g. incorporated via $ZrO_2$. $ThO_2$ is not suitable, because of toxicity respectively radioactivity.

The refractive index is noticeably increased by the use of $HfO_2$ and/or $ZrO_2$.

The optical properties, such as transparency, refractive number, Abbe number and partial dispersion, can be adjusted to the respective needs by a suitable combination of the oxides.

For $Y_2O_3$, the refractive value $n_d=1.91443$ and the Abbe number $v_d=36.2$ and the relative partial dispersion $P_{g,F}=0.5723$.

For $Lu_2O_3$, the refractive value $n_d=1.93483$ and the Abbe number $v_d=38.42$ and the relative partial dispersion $P_{g,F}=0.5725$.

For $Sc_2O_3$ doped with 1% by atom of Yb, the refractive value $n_d=1.99523$ and the Abbe number $v_d=35.07$ and the relative partial dispersion $P_{g,F}=0.5687$.

These three substances are suitable as opto-ceramics according to the present invention.

Preferably, the refractive indices of the opto-ceramics according to the present invention are in a range from 1.80 to 2.1, more preferably from 1.85 to 2.05 and particularly preferably from 1.89 to 2.02. The Abbe number is between 30 and 45, preferably 33 to 40. The relative partial dispersion ($P_{g,F}$) is in a range from 0.560 to 0.580, preferably from 0.565 to 0.575.

Figure 3:
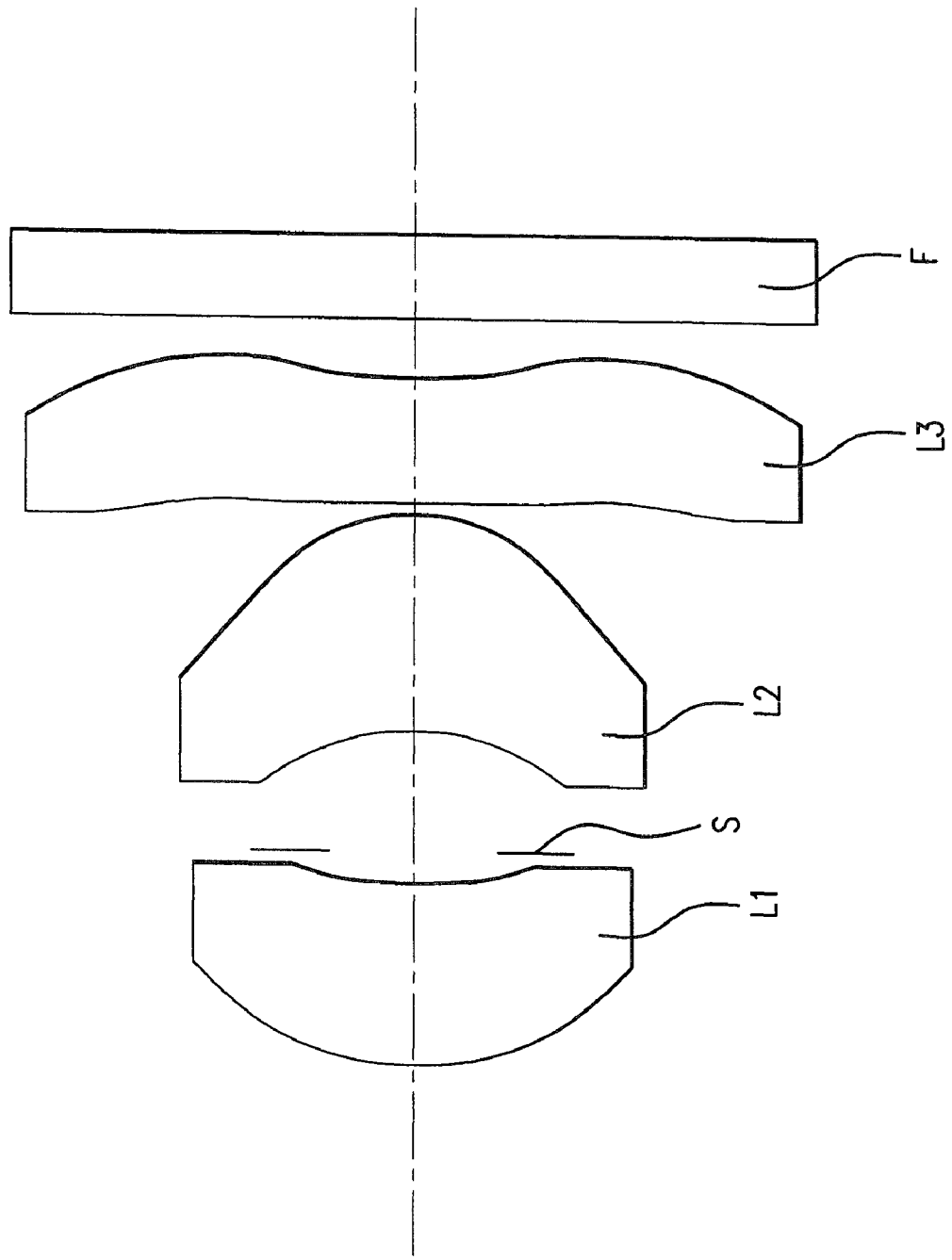
FIG. 3 is a cross-sectional view of a mapping optic according to the present invention.

FIG. 3 shows a group of lenses, which can for example be inserted into a compact objective of an electronic apparatus, such as a mobile phone. According to FIG. 3, the group of lenses comprises, from a side of the object to be observed or imaged, a first lens L1, a lens aperture stop S, a second lens L2 and a third lens L3. Lens L1 has a positive refractive power and its convex surface is oriented toward the object to be imaged. The meniscus-shaped second lens L2 has a positive refractive power and its convex surface is oriented toward the object to be imaged. The third lens L3 has a negative refractive power and its concave surface is oriented toward the object to be imaged. The lens aperture stop S is arranged between the first lens L1 and the second lens L2 and substantially defines together with the focal length of the objective the F-number of the objective.

Figure 4:
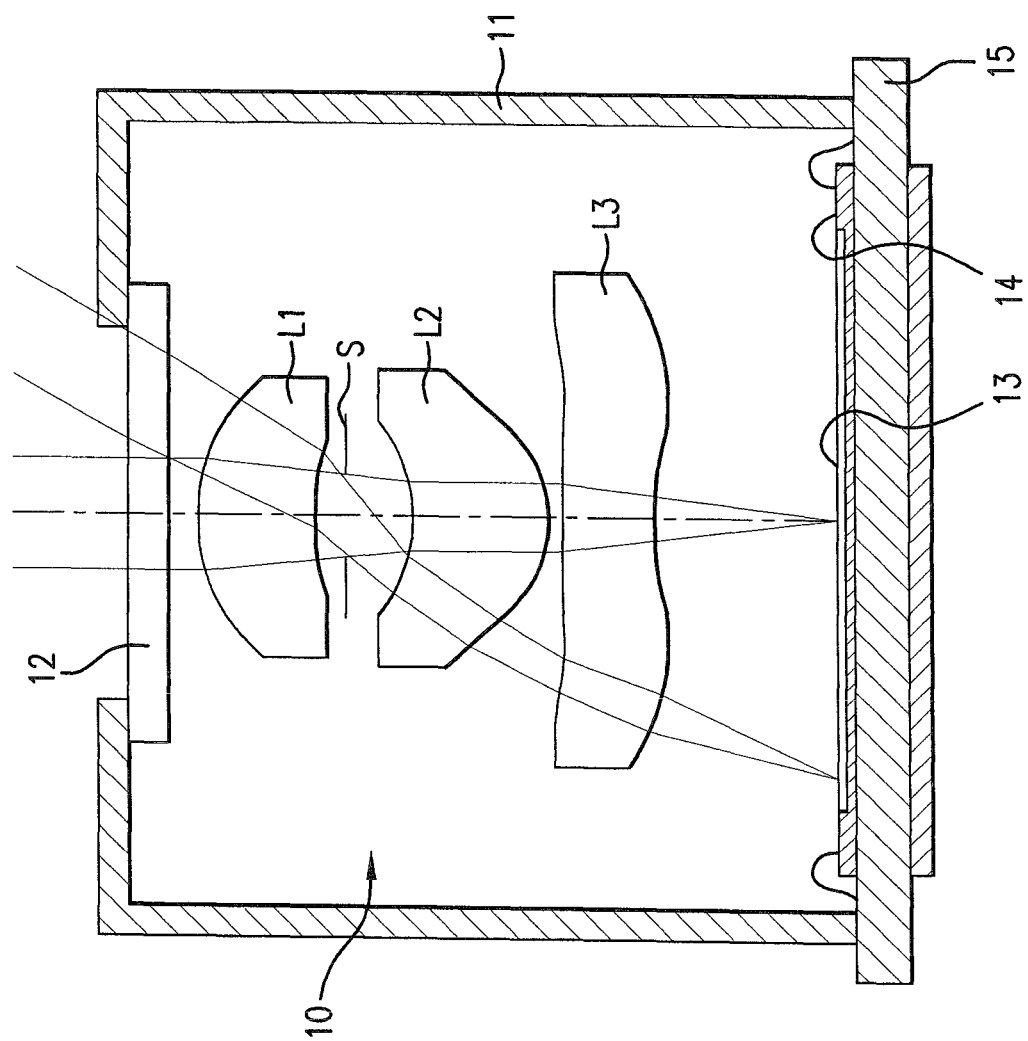
FIG. 4 is a cross-sectional view of a compact image detection device with a mapping optic according to FIG. 3.

FIG. 4 shows a typical set-up of an objective, for example as a mapping optic of a mobile phone, with the group of lenses according to FIG. 3. In one embodiment example, the objective had an F-number of 2.88 with a focal length of 3.789 mm and a total length of the device (up to the photo chip) of 5.55 mm.

In one embodiment example according to the present invention, the very first lens L1 and the cover glass 12 (cf. FIG. 4) have been replaced with a lens of an opto-ceramic according to the present invention with $Y_2O_3$ structure with a refractive index of about 1.914 and an Abbe number of ca. 36.2.

In the following in table I, the design using an optical ceramic lens with a refractive number of about 1.914 and an Abbe number of ca. 36.2 is specified. The ceramic lens can again fulfill the purpose of the cover glass (protection of the objective), since it has good mechanical hardness.

| Number of surface | Type of surface | Radius | Thickness of the lens | Refractive number | Abbe number |
|---|---|---|---|---|---|
| 1 | STANDARD | 4.34118 | 1.000000 | 1.91470 | 36.2 |
| 2 | STANDARD | 14.16802 | 0.597390 | | |

-continued

| Number of surface | Type of surface | Radius | Thickness of the lens | Refractive number | Abbe number |
|---|---|---|---|---|---|
| 3 | STANDARD | infinite | 0.707970 | | |
| 4 | EVENASPH | −1.81781 | 1.210000 | 1.53373 | 56.2 |
| 5 | EVENASPH | −0.98389 | 0.099997 | | |
| 6 | EVENASPH | 4.72134 | 0.780000 | 1.58547 | 29.9 |
| 7 | EVENASPH | 1.67633 | 1.865957 | | |
| 8 | STANDARD | Infinite | | | |

Here, surface 1 is the first surface (on the side of the object to be imaged) of lens L1 and surface 2 is the second surface of L1. Surface 3 represents the lens aperture stop S, the surfaces 4 and 5 belong to lens L2 and the surfaces 6 and 7 belong to L3. Surface 8 presents the image plane on the sensor.

The surfaces 4 to 7 are aspheric surfaces, which can be described by the following equation:

$$z = \frac{r^2/R}{1 + \sqrt{1-(1+k)\left(\frac{r}{R}\right)^2}} + Ar$$

in which z is the coordinate at the optical axis, r is the coordinate that is perpendicular to the optical axis, R is the radius, and the aspheric coefficients A to E are given in table II below (the first line belongs to surface 1, the second line belongs to surface 2 etc. according to table 1):

TABLE II

ASPHERIC COEFFICIENTS A to E

| K | A | B | C | D | E |
|---|---|---|---|---|---|
| 0.00000E+00 | 0.00000E+00 | 0.00000E+00 | 0.00000E+00 | 0.00000E+00 | 0.00000E+00 |
| 0.00000E+00 | 0.00000E+00 | 0.00000E+00 | 0.00000E+00 | 0.00000E+00 | 0.00000E+00 |
| 0.00000E+00 | 0.00000E+00 | 0.00000E+00 | 0.00000E+00 | 0.00000E+00 | 0.00000E+00 |
| 7.37772E−01 | −1.91167E−02 | −2.68967E−01 | 3.97731E−01 | −1.65926E−01 | 0.00000E+00 |
| −2.64060E+00 | −2.20608E−01 | 1.33478E−01 | −8.24039E−02 | 2.21891E−02 | 3.63107E−04 |
| −1.65444E+02 | −6.04354E−02 | 3.15773E−02 | −6.80383E−03 | 4.63038E−04 | 2.47792E−05 |
| −1.07971E+01 | −688965E−02 | 1.77122E−02 | −2.81720E−03 | 1.74517E−04 | 3.80665E−06 |
| 0.00000E+00 | 0.00000E+00 | 0.00000E+00 | 0.00000E+0 | 0.00000E+00 | 0.00000E+00 |

Figure 5B:
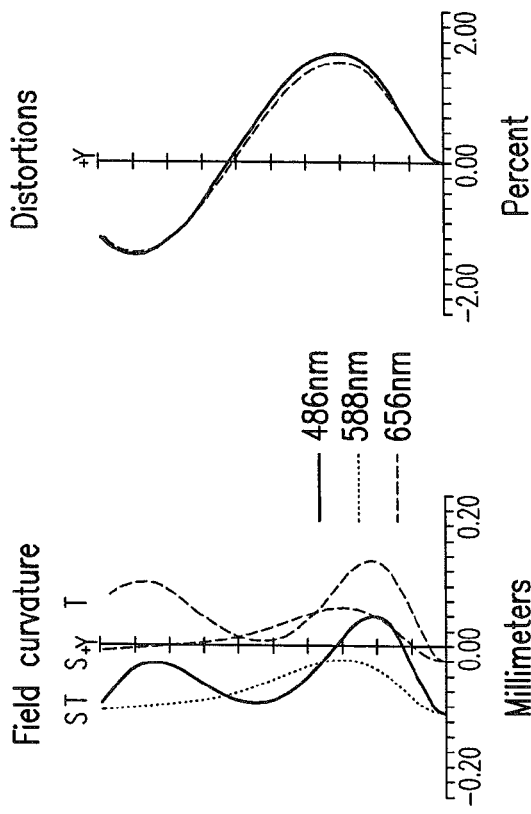
FIGS. 5a and 5b are graphically illustrations of mapping properties of the objective according to FIG. 3 using conventional materials (FIG. 5a) and using a material combination according to the present invention (FIG. 5b)
Figure 5A:
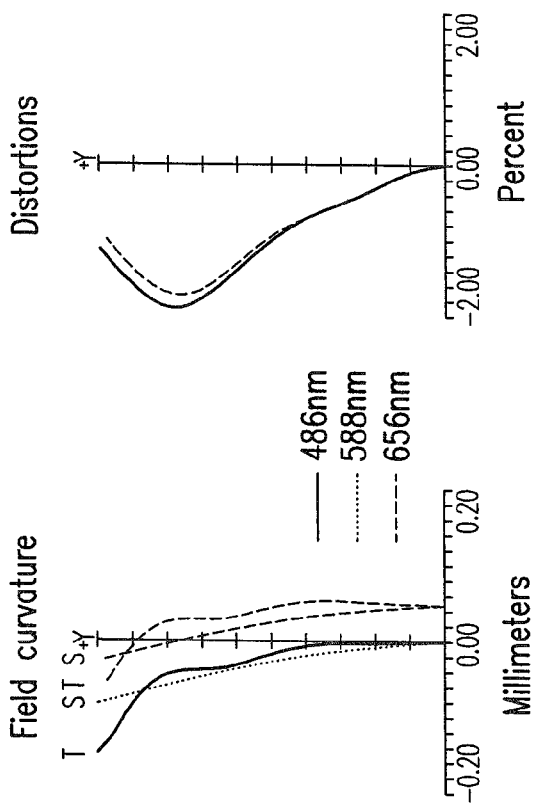
Figure 6B:
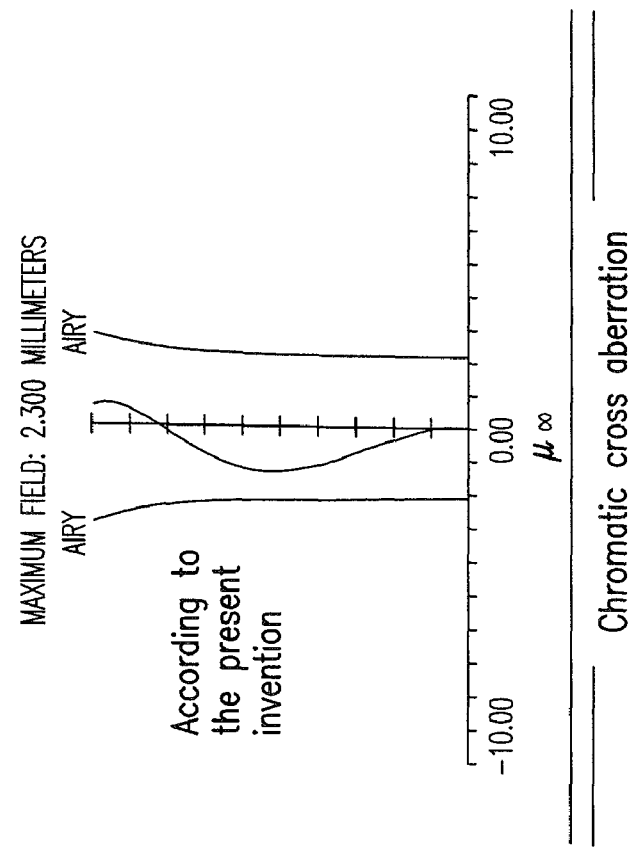
FIGS. 6a and 6b are graphical illustrations showing chromatic mapping aberrations of the objective according to FIG. 3 using conventional materials (FIG. 6a) and using a material combination according to the present invention (FIG. 6b), which clearly shows that the opto-ceramic on the basis of $Y_2O_3$ provides clearly improved chromatic properties (clearly reduced chromatic cross aberration)
Figure 6A:
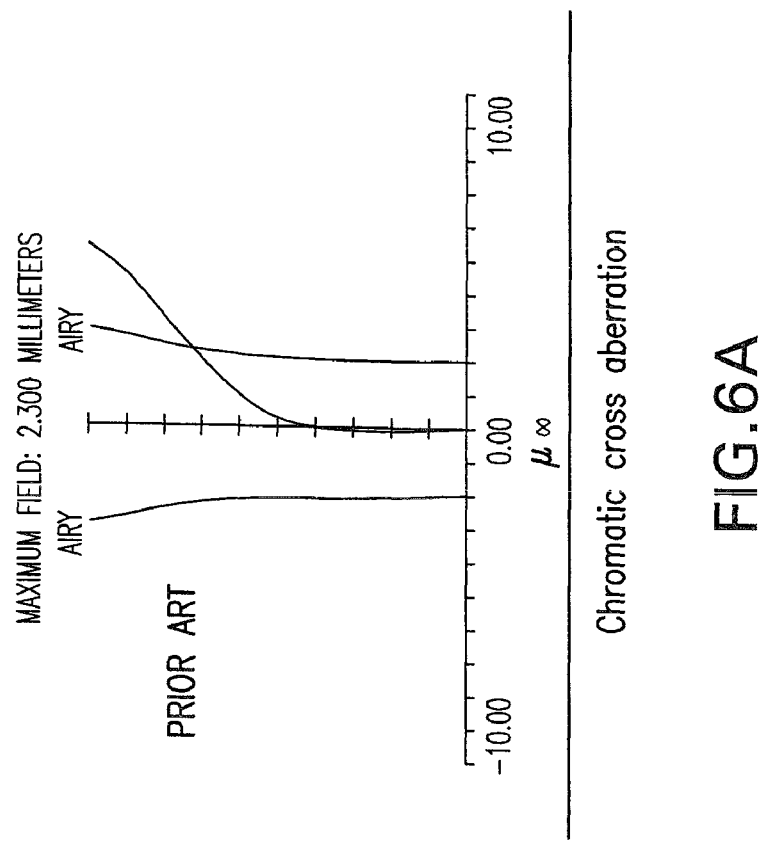

In FIGS. 5 and 6, respectively, the mapping properties have been calculated for conventional material combinations using glass lenses (respectively plastic lenses) (FIG. 5a and FIG. 6a) as well as for the use of the above-mentioned material combination of the opto-ceramic according to the present invention for lens L1 (FIG. 5b and FIG. 6b). One result was that the field curvature was improved to an extent of 24%, the distortion to an extent of 45% and the chromatic cross aberration was substantially improved, namely to an extent of 380%. The clear improvement of the chromatic properties is mainly a result of the good relative partial dispersion (departure of the normal line), which nearly makes apochromatic properties possible.

Overall, thus a compact objective with a total of only three lenses having nearly apochromatic mapping properties could be prepared.

An additional use of the material according to the present invention is its use in infrared applications. Preferably, these materials have high transparency for wavelengths in the range of 800 nm to 8,000 nm, but at least in the range of 800 to 5,000 nm. Absolutely preferably, the optical elements according to the present invention may be lenses of an opto-ceramic of the above-mentioned type, which lead to mapping of both the visible light (ca. 380 nm to ca. 800 nm) and also thermal radiation (infrared) of up to 5,000 nm, further preferably up to 7,000 nm and most preferably up to 8,000 nm.

Applications for the embodiments described here include windows and lenses for the so-called "forward looking Infrared", which are transmissive for infrared, for aircraft for antiballistic missile defense, cover crowns of antiballistic missiles for infrared wave lengths of up to 7,000 nm. In this case, it is particularly convenient that at the same time the material has high transmittance for both visible light and also infrared radiation. This facilitates applications in the field of defense.

Production Procedure for Opto-Ceramics of the "$X_2O_3$" Type

The production procedure substantially comprises the following main steps:
1. Preparation of powder (nanoparticles)
2. Conditioning of powder
3. Forming
4. Drying and Debindering
5. Sintering
6. HIP (Hot Isostatic Pressing)
7. Post Annealing The selection of single process steps as well as of underlying process parameters depends on a variety of factors. To that in particular belong the powder properties (primary particle size, agglomerate size, specific surface, grain shape etc.), the physico-chemical behavior of the respective material itself during the treatment and sintering process, the addressed size/geometry of the product and its desired values of the optical properties. Accordingly, from the above-mentioned and below-described process modules those that result in the desired product have to be selected, wherein costs are also of interest.

1. Preparation of Powder

The production of the opto-ceramic is effected by the use of suitable powders. Methods for that are (co)precipitations, flame hydrolysis, gas condensation, laser ablation, plasma spray methods (CVS processes), sol-gel methods, hydrothermal methods, combustions etc. In view of high packing densities, the shape of the grain is preferably round-shaped and/or preferably spherical. The grains are only in loose contact with each other via Van der Waals forces (soft agglomerates). Ideally, the grains are connected with each other via small bridges in the form of sintering necks. Regarding chemical precipitation reactions, there is a high dependency of the grain fraction and grain shape on the precipitation conditions. Thus a broad spectrum of different starting powders may be produced by the selection of the precipitation medium (carbonate precipitation, hydroxide precipitation, oxalate precipitations) of an e.g. nitrate or chloride solution of e.g. yttrium nitrate and/or yttrium chloride. Powders having different qualities and starting properties (e.g. specific surfaces) may also be achieved by different drying methods of the filter cake (simple drying on air, lyophilization, azeotropic distillation). Furthermore, many additional parameters (pH value, rate of rotation of the stirrer, temperature, precipitation volume etc.) must be considered during the precipitations.

The purity of the powder is a substantial criterion. Each impurity may result in changed sintering conditions or in inhomogeneous distribution of the optical properties. Impurities may lead to the formation of liquid phases, which in the worst case may result in broad inhomogeneous grain boundary regions. However the formation of inter-granular phases (amorphous or crystalline) should be avoided, because of that differences in the refractive index may result which in the case of transmitted light may lead to scattering losses.

The use also of hard agglomerates, i.e. primary particles that have formed bridges during precipitation and calcination and are "fused" together because of that to a greater or lesser extent, is possible according to the choice of the method. So e.g. J. Mouzon describes in a published Licenciate Thesis "Synthesis of Yb:$Y_2O_3$ nanoparticles and Fabrication of Transparent Polycrystalline Yttria Ceramic", Lulea University of Technology, Int. No. 2005:29, that for the avoidance of intragranular pores, i.e. pores inside the grain, differential sintering is advantageous. This will be guaranteed by hard agglomerates, i.e. the primary particles within the agglomerate first are sintered into a dense state, in which remaining pores are preferably located in the grain boundary region. Those could be removed from the structure by the method of hot isostatic pressing.

Furthermore, in the production of (co)precipitated powders there is the possibility of reducing the tendency to agglomerate by the targeted addition of agents. Thus a grinding process is avoided. For that, there is the possibility of adding $NH_4OH$ before the calcination of a precipitated oxalate suspension.

2. Conditioning of Powder

The powders are processed in different ways due to the forming. Normally, the powder is ground with the aim a) to disintegrate the still present agglomerates and b) to homogenize the powder during the addition of additives. The grinding may be performed in dry or wet condition, with the latter being e.g. alcohols or media on a water basis. The times of grinding may be up to 24 hours, but should be selected so that no abrasion of the grinding bodies ($Al_2O_3$, $ZrO_2$) and of the lining of the grinding drum can take place. Ring scission, attritor, ball grinders etc. are suitable as grinding mills. As a medium for example water, liquid alcohols and liquid hydrocarbons, such as heptanes or others may be used.

The drying of the mixtures may again be carried out on air at low temperatures, wherein in the most convenient case the grinding suspension is dried by the means of spray drying. In this case, granules having defined size and quality can be produced. In the case of spray drying, the use of binders is recommended, wherein the spray drying preferably results in soft agglomerates. The size of the agglomerates should not exceed 100 μm, wherein agglomerates in the order of 10 to 50 μm are convenient and agglomerates <10 μm are ideal. Also lyophilization or turbulent flow-drying are possible.

Occasionally, also additives are required, if the nanopowder and/or the nanopowder agglomerate has to be pressed. For forming by casting, e.g. slip casting, pressure casting, centrifugal casting, the powder mixture has to be dispersed in suitable liquefiers. For that for example, Darvan, Dolapix, polyaryl acids, polyacrylic acids, ammonium oxalate monohydrate, oxalic acid, sorbite ammonium citrate or others are suitable.

For plastic forming (extruding, injection molding, heat casting), organic binders of the type polyolefin, e.g. HOSTAMOND® of the company Clariant, or catalytically degrading binders, e.g. of the type CATAMOLD® of the company BASF must be introduced into the powder and must be homogenized in suitable form.

3. Forming

Pressing allows a quick and cheap forming.

For slip casting, the use of molds of gypsum is recommended.

4. Tempering Steps

Vacuum sintering allows the removal of open porosity from the compact powder. The vacuum conditions are above $10^{-3}$ mbar ($=10^{-3}$ hPa), wherein preferably pressures between $10^{-5}$ and $10^{-6}$ mbar ($=10^{-5}$ and $10^{-6}$ hPa) are used. The sintering conditions vary according to the material, wherein for example regimes, such as T=1500° C. to 1800° C. and sintering times of between 1 and 10 hours should be mentioned.

Alternatively, it can also be sintered in specific atmospheres (He, dry or wet hydrogen, N, Ar).

In the case of vacuum sintering, it is important that the growth of the grains is not too fast and uncontrolled. The aim is not to incorporate pores into the grains. For that, e.g. the sintering temperatures can be kept very low. Optionally thereafter the sample is still opaque due to the high pore density, but the pores are closed.

The closed porosity between the grain boundaries may be pressed out of the structure by a subsequent HIP process. Exemplary conditions are 1500° C. to 1800° C., pressures between 100 MPa (1,000 bar) and 200 MPa (2,000 bar). Tempering times of between 1 and 10 hours (without heating and cooling time) are common. W or Mo, optionally also graphite, may be used as a heating element.

Argon may be used as a pressure medium. The sample may be encapsulated and/or embedded in a powder of its own kind to avoid the dissolution of Ar in the grain boundaries, e.g. in glass-like intermediate phases.

By the latter, discoloration by reduction of material at the surface and/or contamination of the sample with constituents of the heating element, which are inside the furnace chamber, can be avoided. Thus "post tempering" in air is not necessary. If still required, it should be conducted on air or in oxygen. Exemplary conditions are 1 to 48 hours at up to 1400° C.

A special process can reduce intra-granular fine porosity. This process includes targeted growth of the grains, which takes place in such a manner that newly built up grain boundaries grow beyond the region of the pore volume enclosed in the grain.

For that, the sample is again subjected to a sintering process after the HIP process. A combined process of "vacuum hot pressing" may also be used instead of vacuum sintering and the subsequent HIP process.

EXAMPLE

High purity $Y_2O_3$, $La_2O_3$ and $HfO_2$ powders were used as starting materials. The powders were mixed with additives and binders and ball milled for 12 h in ethanol. Then the alcohol solvent was removed by drying the milled slurry on a hot plate. The so-obtained powder was pressed with low pressure into required shapes in a metal mold and then cold isostatically pressed at 98 MPa.

Transparent $Y_2O_3$ ceramics were obtained after sintering under vacuum ($1 \times 10_{-3}$ Pa) at 1700° C. for 3 h followed by hot isostatic pressing at 1780° C. for 2 h at a pressure of 196 MPa in Ar atmosphere.

The Interaction of light with an optically transparent material is given by the addition of reflection, absorption, scattering and specular transmission. The reflection losses are inherent to the material due to Snells' law. The total amount of light emerging from a material is termed "total transmittance", while its specularly transmitted portion is termed "in-line transmittance" ($T_{in\text{-}line}$) after taking into account scattering as a possible loss mechanism.

$$T_{in\text{-}line} = I_{in\text{-}line}/I_0 = 10^{-(kin\text{-}line)t},$$

in which $I_{in\text{-}line}$ and $I_0$ are the specularly transmitted intensity leaving the sample and the incident intensity, respectively, and kin-line is the absorption coefficient. A graphic representation can be seen from FIG. 7.

Figure 7:
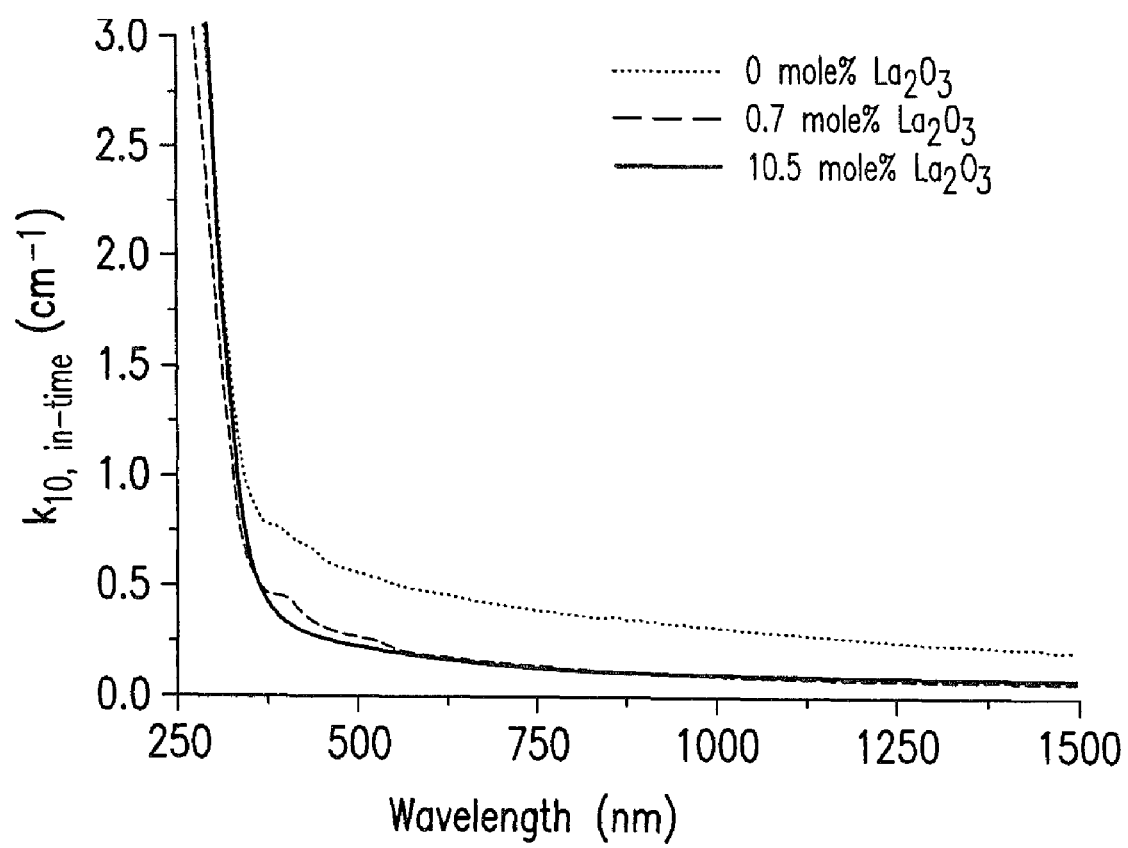
FIG. 7 is a graphical illustration showing the dependence of absorption on wavelength for several different opto-ceramics comprising $Y_2O_3$ with varying amounts of $La_2O_3$ added.

All prepared samples were transparent. The samples containing few to no $La_2O_3$ showed yellow discoloration. In FIG. 7 the linear absorption of $Y_2O_3$ opto-ceramics containing different amounts of $La_2O_3$ is graphically illustrated. Clearly a broad absorption band at ~400 nm is seen for the opto-ceramics containing 0 and 0.7 mole % $La_2O_3$. Surprisingly the sample with ~10 mole % $La_2O_3$ does not show this yellow coloration, transmitting in the UV-VIS absorption diagram and not showing any absorption band in the visible.

Therefore $La_2O_3$ has been shown to promote transmission and thus optical quality for lens applications.

LIST OF REFERENCE CHARACTERS

1 Biconvex lens
2 Biconcave lens
3 Substrate
4 Spherical lens
10 Image detection facility
11 Casing
12 Cover plate/IR filter
13 Photo sensor
14 Signal processing circuit
15 Support plate While the invention has been illustrated and described as embodied in optical elements and mapping optics, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A refractive, transmissive or diffractive optical element comprising a ceramic; and wherein said ceramic consists of a crystal combination of individual crystallites with a cubic structure, which is an analogue of that of $Y_2O_3$, said ceramic is transparent to visible light and/or to infrared radiation, said ceramic comprises one or at least two oxides of formula $X_2O_3$ and optionally at least one of $HfO_2$ and $ZrO_2$; and wherein, for each of said one or at least two oxides, X is a different element selected from the group consisting of Y, Sc, In, La, Ce, Pr, Nd, Pm, Sm, Eu, Gd, Tb, Dy, Ho, Er, Tm, Yb and Lu.

2. The optical element according to claim 1, in which impurities in an amount of at maximum 100 ppm are present in said ceramic.

3. The optical element according to claim 1, having a refractive index greater than or equal to 1.80 and an Abbe number greater than 30.

4. The optical element according to claim 1, having a refractive index between 1.85 and 2.05 and an Abbe number between 30 and 45.

5. The optical element according to claim 1, having an Abbe number between 30 and 42 and a relative partial dispersion between 0.56 and 0.58.

6. The optical element according to claim 1, which is transparent to said visible light.

7. The optical element according to claim 1, which is transparent to said infrared radiation.

8. The optical element according to claim 1, which is transparent to said visible light and said infrared radiation.

9. The optical element as defined in claim 1, wherein said different element is selected from the group consisting of Y, Sc, In, Lu, Yb, Gd and La.

10. The optical element as defined in claim 1, wherein said ceramic is free of each of Pr, Nd, Sm, Eu, Tb, Dy, Ho, Er and Tm.

11. The optical element as defined in claim 1, wherein one of said oxides is $Y_2O_3$ and at least one other of said oxides is selected from the group consisting of $La_2O_3$, $Gd_2O_3$, $Sc_2O_3$, $In_2O_3$, $Lu_2O_3$ and $Yb_2O_3$.

12. A mapping optic, comprising at least two lenses of at least two different transparent materials, wherein at least one of said lenses is made of a ceramic and at least one other of said lenses is made of glass; and wherein said ceramic consists of a crystal combination of individual crystallites with a cubic structure, which is an analogue of that of $Y_2O_3$, said ceramic is transparent to visible light and/or to infrared radiation, said ceramic comprises one or at least two oxides of formula $X_2O_3$ and optionally at least one of $HfO_2$ and $ZrO_2$; and wherein, for each of said one or at least two oxides, X is a different element selected from the group consisting of Y, Sc, In, La, Ce, Pr, Nd, Pm, Sm, Eu, Gd, Tb, Dy, Ho, Er, Tm, Yb and Lu.

13. The mapping optic according to claim 12, in which said lenses are only refractive.

14. The mapping optic according to claim 12, in which at least one of said lenses has a diffractive structure.

15. The mapping optic according to claim 12, in which relative partial dispersions of the respective lenses made of the glass and the ceramic are approximately similar to one another.

16. The mapping optic according to claim 12, in which a difference between relative partial dispersions of the respective lenses made of the glass and the ceramic is less than 10% and a difference between the Abbe numbers of the respective glass and the ceramic is greater than 10.

17. The mapping optic according to claim 12, in which the lens made of the ceramic has a relative partial dispersion in a range of between 0.56 and 0.58 and an Abbe number in a range of between 30 and 40 and the lens made of the glass has a relative partial dispersion of between 0.555 and 0.585 and an Abbe number less than 45.

18. The mapping optic according to claim 12, in which said glass is selected from the group consisting of N-BaF4, N-BaF10, N-SSK8, N-SSK5, N-KF9, LLF1, TiF1, T1F2 and glasses having optical positions that are comparable to those of the foregoing.

19. The mapping optic according to according to claim 12, wherein said lenses are arranged to form a compact objective having a predetermined focal length.

20. The mapping optic according to claim 12, wherein a first lens, which is arranged on a side closest to an object to be imaged, is a purely refractive lens.

21. The mapping optic according to claim 20, wherein the first lens, which is arranged on the side closest to the object to be imaged, is a spherical lens.

* * * * *